United States Patent [19]

Merry

[11] 4,227,700
[45] Oct. 14, 1980

[54] MAST COLLAR SYSTEM

[75] Inventor: Carl A. Merry, Marion, Mass.

[73] Assignee: Schaefer Marine, Inc., New Bedford, Mass.

[21] Appl. No.: 131

[22] Filed: Jan. 2, 1979

[51] Int. Cl.³ .................. F16J 15/06; B63B 21/04; B63H 9/06; E02D 27/42
[52] U.S. Cl. ...................... 277/12; 277/166; 277/186; 277/189; 277/191; 114/93; 114/101; 114/111; 248/632
[58] Field of Search ................ 277/12, 101, 152, 166, 277/186, 189–191, 207 R, 214; 114/93, 90, 101, 111; 248/622, 632, 634, 635

[56] References Cited

U.S. PATENT DOCUMENTS

| 80,884 | 8/1868 | Stevens et al. | 114/93 |
|---|---|---|---|
| 132,774 | 11/1872 | Perkins et al. | 114/93 |
| 197,980 | 12/1877 | Robbins | 114/93 |
| 3,795,215 | 3/1974 | Butler | 114/90 |
| 3,873,102 | 3/1975 | Lotze et al. | 277/2 |
| 3,930,562 | 1/1976 | Zorn | 114/90 X |
| 4,064,821 | 12/1977 | Roberts et al. | 114/90 X |
| 4,067,525 | 1/1978 | Allen | 248/632 |
| 4,072,121 | 2/1978 | Anderson et al. | 114/90 |
| 4,149,650 | 4/1979 | Whelchel et al. | 220/378 X |

FOREIGN PATENT DOCUMENTS

| 1372 of 1866 | United Kingdom | 114/93 |
|---|---|---|
| 1946 of 1889 | United Kingdom | 114/93 |
| 12756 of 1891 | United Kingdom | 114/90 |
| 890032 2/1962 | United Kingdom | 248/632 |

Primary Examiner—Robert S. Ward, Jr.
Attorney, Agent, or Firm—Cesari and McKenna

[57] ABSTRACT

A mast collar system for securement to a surface at the location where the mast extends down through the surface includes a rigid collar which loosely encircles the mast. Positioned in the gap between the mast and the collar is a resilient ring. An annular groove extends down into the ring and a spline is pressed down into the groove so that a fluid-tight gasket is formed between the mast and the collar. The ring or spline also includes a fin which resiliently engages the mast directly above the annular line of sealing engagement between the mast and the ring per se.

19 Claims, 9 Drawing Figures

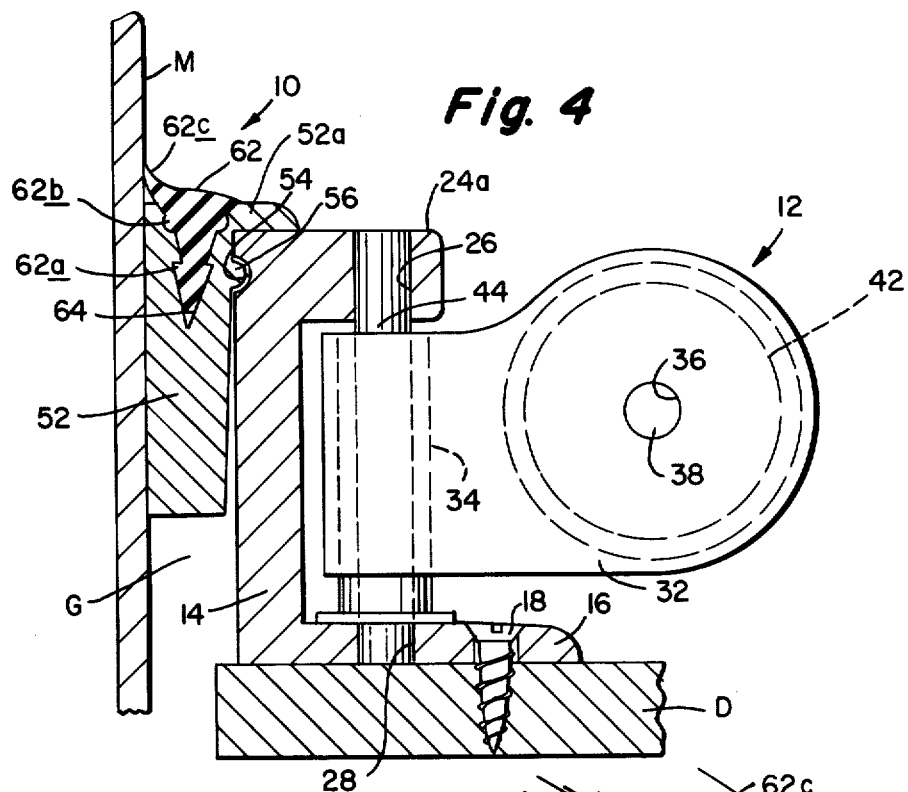
*Fig. 4*
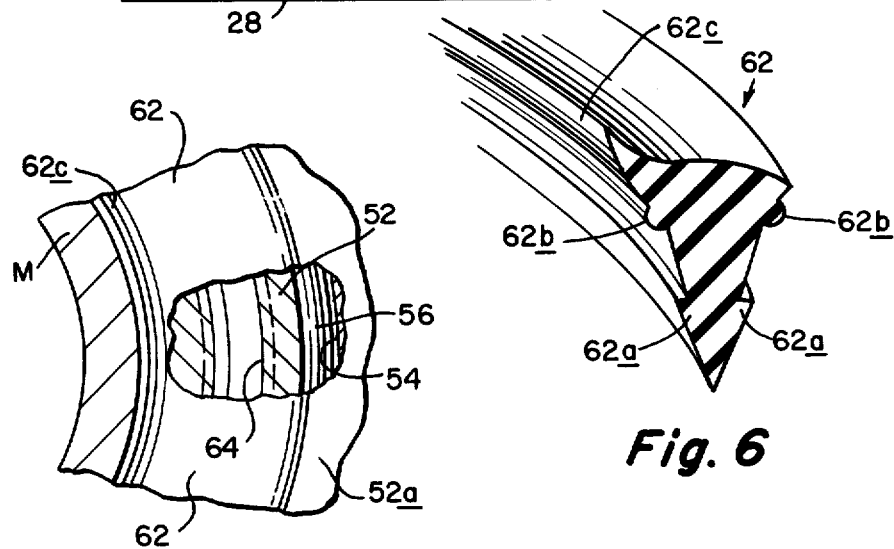
*Fig. 5*
*Fig. 6*

4,227,700

MAST COLLAR SYSTEM

BACKGROUND OF THE INVENTION

This invention relates to a mast collar system. It relates more particularly to an improved sealing joint construction between a mast and a boat deck.

A mast collar is a fitting that is engaged around the mast at the point where the mast projects down through the boat deck. The purpose of the collar is to fill the gap between the mast and the edge of the deck opening and to provide a watertight joint or gasket between the mast and the deck. Also mast collars include means for swivelly attaching blocks to accommodate the various lines running down the mast. Conventionally, the collar is exactly what the name implies, simply a flanged ring which engages around the mast at the point where the mast projects through the boat deck with the ring flange being screwed to the deck. Sometimes a resilient gasket is disposed between the ring and the mast to provide a more effective watertight seal at the joint.

Prior mast collar constructions of this general type have not been entirely satisfactory. This is because as the mast flexes when the boat is under sail, the gasketing material is forced or works itself out of the space between the collar and the mast leaving a gap through which water can enter and drip down into the interior of the boat hull causing damage to interior woodwork, fixtures and the like.

Some attempts have been made to avoid this problem by providing redundant gasketing and mast collars with very high tolerances. However, these attempts have proven to be expensive and have not entirely eliminated the leakage problem.

SUMMARY OF THE INVENTION

Accordingly, it is the object of the present invention to provide an improved mast collar system.

It is a further object of the invention to provide a mast collar which retains its sealing effectiveness even though there is appreciable relative movement between the mast and the boat deck.

A further object of the invention is to provide a system of this type which is relatively inexpensive to manufacture.

Still another object of the invention is to provide a mast collar system which is relatively easily installed on most sailboats having masts which project down through the boat deck.

Other objects will in part be obvious and will in part appear hereinafter.

The invention accordingly comprises the features of construction, combination of elements and arrangement of parts as will be exemplified in the following detailed description, and the scope of the invention will be indicated in the claims.

The mast collar system of this invention employs a flanged collar which encircles the mast where the mast projects down through the boat deck, the ring flange being screwed or otherwise secured to the boat deck. Instead of dimensioning the collar to snugly fit around the mast, however, it is oversized so as to leave a substantial gap between the inner wall of the collar and the mast. Forced down into this gap is a flanged ring made of a resilient material such as a rubber composition. In some embodiments, the ring bears against the inside wall of the collar and against the outside wall of the mast with its flange overlying the outer collar thereby forming a relatively thick resilient gasket between the mast and the collar.

The outside wall of the resilient ring and the inside wall of the collar are shaped with one or more mating annular tongues and grooves which help to retain the resilient ring in place in wedging engagement between the mast and the collar. In addition, the resilient ring is formed with a vertical annular groove in that part of the ring which projects into the gap between the mast and the collar. Forced into this groove is a resilient spline which is somewhat wider than the groove so that the engagement of the spline in the groove forces the groove walls apart thereby pressing the ring walls into even tighter resilient engagement with the mast and the collar, particularly at the locations where the ring and collar interfit.

Furthermore, the cross-section of the spline has a barbed configuration, with the walls of the groove being a negative image of that cross-section so that once the spline is pressed into the groove, it is removed only with difficulty. Also, the spline on the ring is formed with a flexible resilient fin which projects toward the mast so that when the spline is seated in the ring groove, the fin resiliently engages the outside surface of the mast directly over the annular line of engagement between the resilient ring and the mast. Thus the spline not only functions as a wedge to help retain the ring in place between the mast and the collar; it also cooperates to provide an auxiliary or secondary seal between the mast and the ring.

In another system embodiment, the ring groove is formed at the inner diameter of the ring just outboard of the mast. In this case, the spline with an integral fin is pressed down into the annular space between the mast and the groove wall, the spline and ring interlocking to provide the watertight seal between the mast and the collar.

The aforesaid three-piece mast collar system provides an especially effective flexible watertight joint between a mast and the boat deck through which the mast extends. The resilient ring is able to accommodate even extreme flexing movements of the mast relative to the boat deck without losing its sealing effectiveness. Moreover, there is little likelihood of such movements dislodging the ring or causing it to work its way out of the gap between the mast and the collar. Yet the system is easily installed on most conventional boats without requiring any special tools or equipment.

BRIEF DESCRIPTION OF THE DRAWINGS

For a fuller understanding of the nature and objects of the invention, reference should be had to the following detailed description taken in connection with the accompanying drawings, in which:

FIG. 4 is a sectional view along line 4—4 of FIG. 3;

FIG. 5 is a plan view on a larger scale with parts broken away of a portion of FIG. 3;

FIG. 6 is a fragmentary isometric view showing a component of the system in greater detail;

DESCRIPTION OF PREFERRED EMBODIMENT

Figure 1:
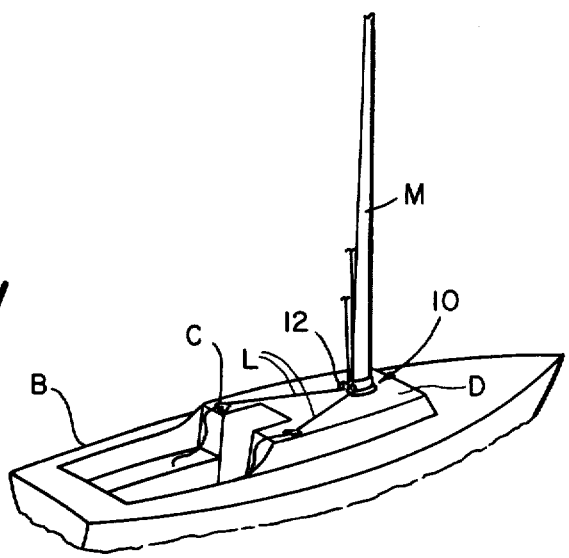
FIG. 1 is an isometric view of a sailboat equipped with a mast collar system made in accordance with this invention.

Referring first to FIG. 1 of the drawings, a boat B having a mast M projecting down through its cabin D is equipped with my mast collar system, indicated generally at 10, at the joint between the mast and the cabin D. The system 10 includes the usual set of turning blocks 12 around which lines L running down the mast are trained on the way to various points of securement such as cleats C.

Figure 2:
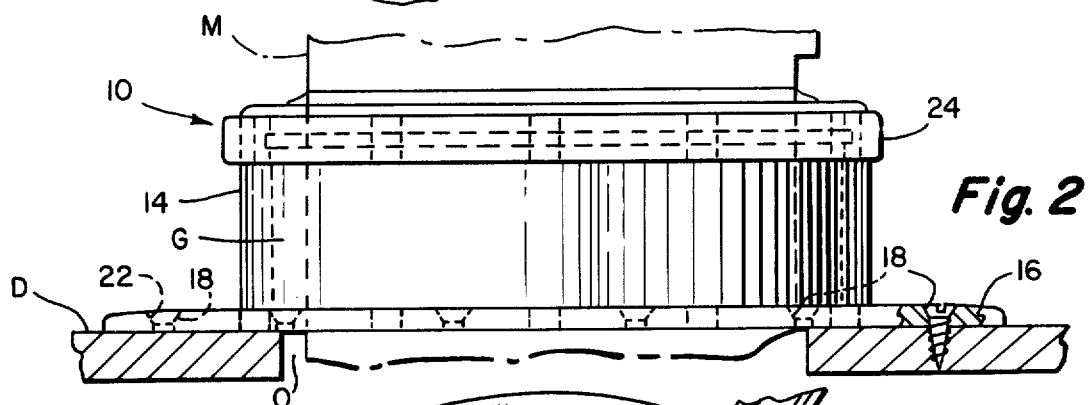
FIG. 2 is a side elevational view on a much larger scale showing the system in greater detail.
Figure 3:
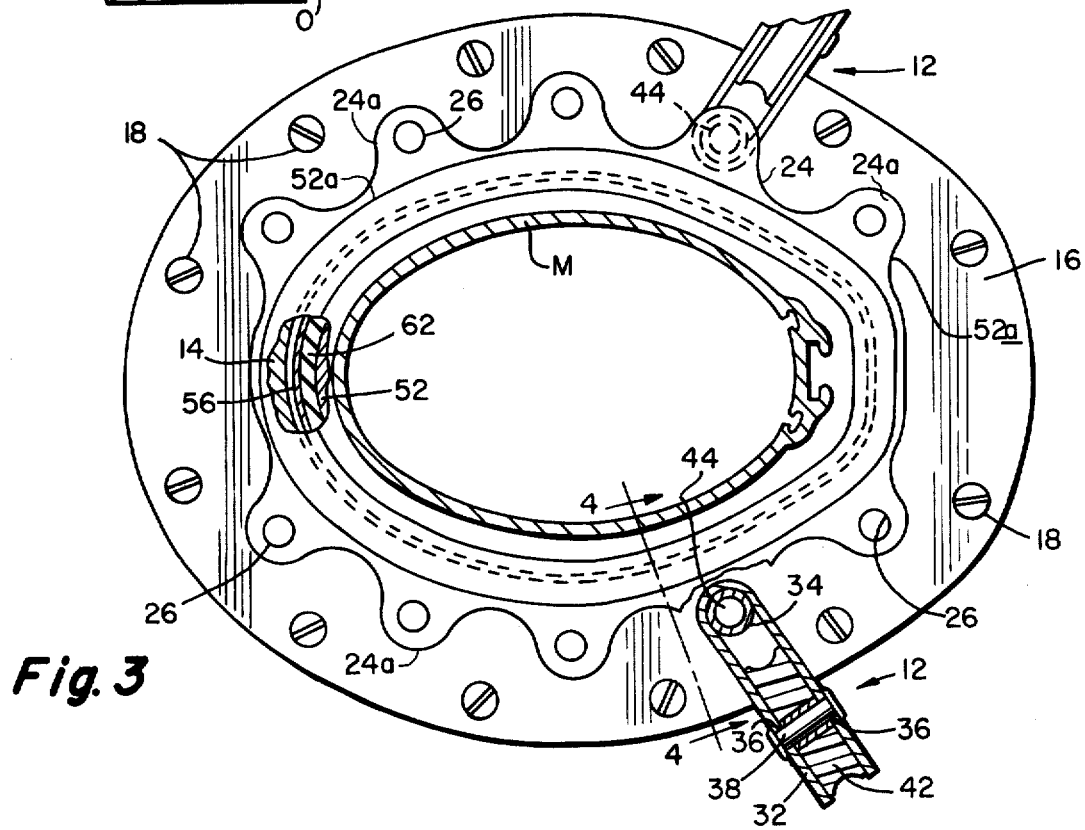
FIG. 3 is a top plan view thereof.

Turning now to FIGS. 2 and 3, the mast collar system 10 includes a rigid collar 14 made of anodized or epoxy coated aluminium or other comparable material resistant to salt water corrosion. The opening through collar 14 is more or less the same shape as the external cross-section of mast M and it is somewhat larger thereby leaving a gap G between the mast and the collar all around the mast. The collar also includes an external lateral flange 16 at its lower end which fits flush against the top surface of the cabin D all around the cabin opening O through which the mast projects. The collar is permanently secured to the cabin by screws 18 projecting through countersunk openings 22 distributed around the flange 16, with the screws being turned down into the cabin D.

Still referring to FIGS. 2 and 3, although it is not necessary, the illustrated collar is arranged to provide turning block 12 anchoring points all around the mast M so that the turning blocks can be arranged selectively to point in various directions away from the mast to handle the wide variety of rigging configurations found on present day sailboats. For this purpose, the collar 14 is provided with a lateral peripheral flange 24 spaced above flange 16, the flange 24 being scalloped all around its periphery to provide an array of nodes 24a of extra thickness. A vertical opening 26 is formed in each node which is aligned with a corresponding opening 28 (FIG. 4) in flange 16. These openings 26 and 28 form potential journals for a turning block 12.

As best seen in FIGS. 3 and 4, each turning block 12 comprises a strap 32 which is turned back on itself around a sleeve 34 with the sleeve being spot welded to the strap. The two ends of the strap 32 are provided with aligned openings 36 to receive the opposite ends of a pivot pin 38 on which a sheave 42 is rotatively mounted. The turning block is swivally connected to collar 14 by positioning the sleeve 34 in line with a pair of openings 26 and 28 in flanges 24 and 16 respectively and inserting a bearing pin 44 into the sleeve and those openings as seen in FIG. 4.

Still referring to FIGS. 3 and 4, the mast collar system also includes a resilient ring 52 made of a relatively stiff but resilient material such as a rubber composition. The ring is wedged-shaped in cross-section as best seen in FIG. 4 so that it can be forced down into the gap G between the mast M and collar 14. It is dimensioned so as to resiliently wedge against the walls of the mast and collar, allowing for the usual dimensional variations in the mast and collar cross-sections due to customary manufacturing tolerances.

The ring 52 is provided at its top with a laterally extending peripheral flange 52a which overlies the top of collar 14 including its flange 24.

Referring now to FIGS. 4 and 5, to help retain the ring 52 in place in gap G, an annular groove 54 is formed in the inside wall of collar 14 near the top thereof. Groove 54 extends all around the collar and is arranged to snugly receive an annular bead 56 formed in the outside wall of ring 52. Thus once the ring 52 is seated as shown in FIG. 4, the bead 56 snaps into the groove 54 and resiliently retains the ring in place in wedging engagement between the mast M and the collar 14. The ring flange 52a extends out to the edge of the collar flange 24 and is held in resilient engagement with its top surface. This interlocking construction minimizes the chances of water being able to penetrate the system between the annular surfaces of engagement between the ring and the collar.

When a boat is under sail, the mast M may flex causing considerable relative movement between the mast and collar 14. To eliminate any likelihood of the ring working its way out of gap G or being forced out, and to insure a watertight seal between the ring 52 and the mast M, the present collar system also includes a spline or sealing wedge 62 made of flexible resilient material. As best seen in FIG. 6, the spline has a wedge-shaped cross-section end provided with barbs 62a near its lower end and beads 62b near its upper end. The barbs and beads extend all along the length of the spline. The spline also includes a laterally extending, flexible, resilient fin 62c projecting laterally from its upper end. Spline 62 is arranged to be pressed down into a similarly shaped groove 64 extending down into ring 52 from its upper end.

Referring now to FIGS. 4 and 5, when ring 52 is uncompressed, groove 64 has more or less the same dimensions and cross-sectional shape as spline 62. However, when the ring is wedged down into gap G, the width of groove 64 is reduced to some extent so that when the spline 62 is forced down into the groove, the spline spreads the groove walls apart thereby forcing the opposite walls of the ring against mast M on the one hand and collar 14 on the other. Needless to say also, the spline 62 ensures that the bead 56 remains seated in the ring groove 54.

With the spline 62 in place as shown in FIG. 4, its fin 62c resiliently engages the wall of mast M over a relatively wide annulus providing an auxiliary or secondary annular seal of relatively large areas between the mast and the collar system directly over the joint between ring 52 and the mast. The fin 62c, being relatively wide and flexible, remains resiliently engaged against the mast surface even though the mast flexes considerably relative to collar 14. The spline 62 may be in the form of a ring. Alternatively, it may be a single, straight molded piece which, starting from one end, is pressed down into groove 64 until the entire groove is filled, with the excess spline length being cut off.

Figure 7:
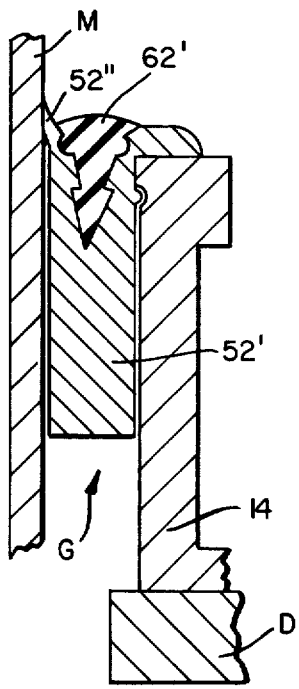
FIG. 7 is a view similar to FIG. 4 of another embodiment of my system.

Refer now to FIG. 7 which illustrates another embodiment of my system. Components which are similar to those in the FIGS. 2 to 6 system version carry the same identifying numerals.

Here the fin 52" engaging the mast M and forming the auxiliary seal is made an integral part of the ring 52'. A modified spline 62 having no fin is wedged down into the groove 64 in the ring to retain it as described above.

Figure 8:
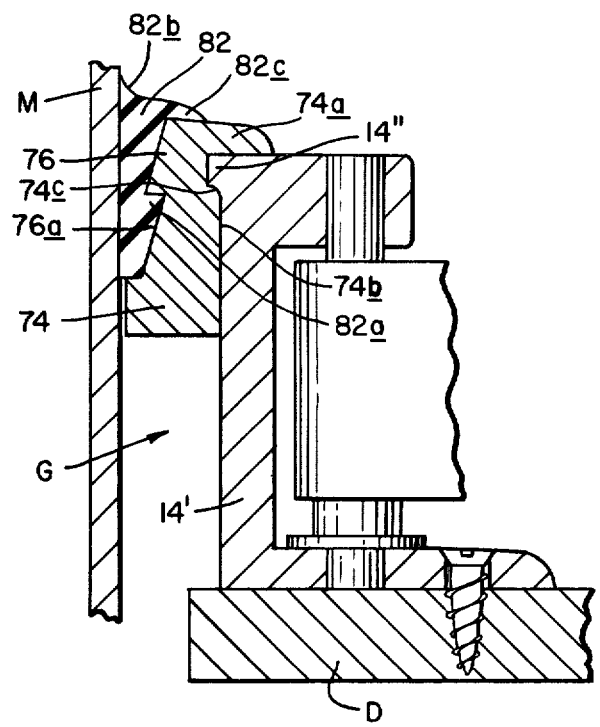
FIG. 8 is a similar view of still another system embodiment.
Figure 9:
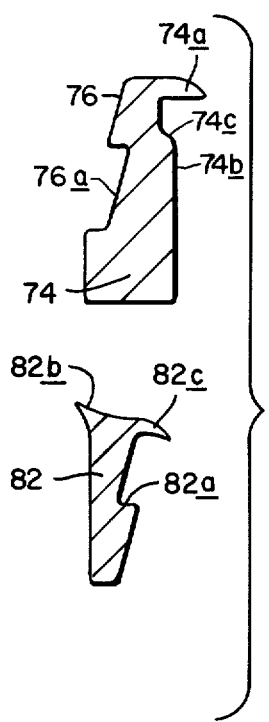
FIG. 9 is a sectional view on a larger scale showing elements of the FIG. 8 system in greater detail.

FIGS. 8 and 9 show still another embodiment of my collar system. Here the mast collar 14' is made slightly differently than the one described above. Its inner wall is formed with an annular flange 14" instead of a groove. A resilient ring 74 is inserted between the mast M and the collar, the ring having the usual flange 74a overlying the collar.

The outside wall 74b of the ring is formed with an annular shoulder 74c which engages under the collar flange 14". The otherwise cylindrical inside wall of the ring is formed with a groove 76 having the general shape of a section of a conical surface of revolution so that it tapers downward toward the mast M. Formed in that wall is an annular notch or channel 76a.

A spline 82 having a barbed tapered outer wall is arranged to be wedged down between the mast M and the ring 74 so that it seats in groove 76 with its annular barb 82a engaging in the ring notch 76a. In this version, a resilient sealing fin 82b is present as an integral part of the spline as it is in the FIG. 4 system. Preferably also the spline includes an outboard flange 82c adjacent its upper edge which overlies ring 74 to ensure a fluid tight seal between the spline and the ring.

The latter two embodiments of my system have all of the advantages of the one just described.

It will be appreciated from the foregoing description that the present mast collar system provides a particularly flexible joint between the mast and a boat deck or cabin. The system tolerates an unusually large degree of mast flexing without losing its sealing integrity. Further, it provides a great amount of flexibility in the placement of the turning blocks which are used to a great extent on present day sailboats. Yet the system is easy to install on most conventional sailboats without requiring any special tools or equipment.

What is claimed as new and desired to be secured by Letters Patent of the United States is:

1. A mast collar system comprising
   A. a rigid collar for loosely encircling a mast at the location where the mast projects through an opening in a boat deck or other surface, a portion of the collar being arranged to engage and be secured to the boat deck outboard of the opening therein,
   B. a flexible resilient ring for engaging around the mast, said ring having an annular portion arranged and adapted to be positioned in the annular gap between the mast and the collar encircling the mast to provide a resilient gasket between the mast and the collar,
   C. means defining an annular groove in the top of the ring, said groove extending down into the ring, and
   D. a spline arranged to be pressed down into said groove so as to compress the ring portion positioned between the mast and the collar.

2. The system defined in claim 1 wherein one of the spline and ring is formed with a lateral flexible, resilient fin arranged to resiliently engage the mast above the joint between the mast and ring portion.

3. The system defined in claim 1 wherein the engaging side walls of said spline and said groove are irregularly shaped from top to bottom so that the sidewalls of the spline interfit with the sidewalls of the groove to help retain the spline in the groove.

4. The system defined in claim 3 wherein the cross-section of the spline has barbs.

5. The system defined in claim 1 wherein the spline and groove have wedge-shaped cross-sections.

6. The system defined in claim 1 wherein the groove is located at the inner surface of said ring.

7. The system defined in claim 1 wherein the groove is located between the inner and outer surfaces of said ring so that said spline forces the inner and outer surfaces of the ring toward the surfaces of the mast and collar respectively.

8. A mast collar system comprising
   A. a rigid collar for loosely encircling a mast at the location where the mast projects through an opening in a boat deck or other surface, a portion of the collar being arranged to engage and be secured to the boat deck outboard of the opening therein, and
   B. a flexible resilient ring for engaging around the mast, said ring having an annular portion arranged and adapted to be positioned in the annular gap between the mast and the collar encircling the mast to provide a resilient gasket between the mast and the collar,
   the mutually engagable walls of the ring and collar being formed with interlocking portions which resiliently retain the ring in the gap between the mast and the collar.

9. The system defined in claim 8 and further including journal means distributed around the collar.

10. The system defined in claim 9 and further including
    A. at least one block, and
    B. means for swivelly securing a portion of said block to one of said journal means.

11. A mast collar system comprising
    A. a rigid collar for loosely encircling a mast at the location where the mast projects through an opening in a boat deck or other surface, a portion of the collar being arranged to engage and be secured to the deck or other surface,
    B. a flexible resilient ring arranged and adapted to be positioned in the gap between the mast and collar,
    C. means defining an annular groove extending down into the ring, and
    D. a spline for pressing down into the groove so as to maintain the outer surface of the ring in resilient engagement with the collar in which the ring is positioned.

12. The system defined in claim 11 wherein said ring is wedge-shaped in cross-section so that it wedges into said gap.

13. The system defined in claim 11 wherein the mutually engagable walls of the ring and collar are formed with interfitting portions which help to resiliently retain the ring in the gap between the mast and the collar.

14. The system defined in claim 11 wherein one of said spline and ring is formed at its top with a laterally extending flexible and resilient fin which resiliently engages the mast encircled by said ring and collar.

15. The system defined in claim 14 wherein the spline is generally wedge-shaped in cross-section.

16. The system defined in claim 11 wherein the groove is the negative image of the spline portion pressed into the groove.

17. The system defined in claim 16 wherein the spline cross-section is formed with one or more lateral projections which interfit with corresponding lateral recesses in the groove walls.

18. The system defined in claim 11 wherein said ring is formed at its top with a laterally extending flange for resiliently engaging and over the top surface of said collar.

19. A mast collar system comprising
    A. a rigid collar for loosely encircling a mast at the location where the mast projects through an opening in a boat deck or other surface, a portion of the collar being arranged to engage and be secured to the deck or other surface,
B. flexible resilient means arranged and adapted to be positioned in the gap between the mast and collar to function as a fluid-tight gasket,
C. journal means distributed around the collar, and wherein
D. said collar is formed with spaced-apart upper and lower lateral flanges, E. said journal means comprises pairs of aligned openings in said collar flanges, and
F. said securing means comprises a pin extending through a pair of said openings and through said portions of the block positioned between said collar flanges, and
G. further including at least one block swivally secured to said pin.

* * * * *